(12) United States Patent
Rigney et al.

(10) Patent No.: US 7,625,628 B2
(45) Date of Patent: Dec. 1, 2009

(54) HIGH INTEGRITY POLYESTER STRAPPING

(75) Inventors: Patrick T. Rigney, Allentown, PA (US); Bobby L. Goin, Florence, SC (US); Jesse G. McLawhorn, Florence, SC (US); Gary L. Vadnais, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 418 days.

(21) Appl. No.: 10/510,550

(22) PCT Filed: Apr. 4, 2003

(86) PCT No.: PCT/US03/10314

§ 371 (c)(1),
(2), (4) Date: Jun. 9, 2005

(87) PCT Pub. No.: WO03/087200

PCT Pub. Date: Oct. 23, 2003

(65) Prior Publication Data

US 2005/0238897 A1 Oct. 27, 2005

(51) Int. Cl.
B32B 27/36 (2006.01)
(52) U.S. Cl. ................ 428/212; 428/480; 525/165; 525/191
(58) Field of Classification Search ................ 428/212, 428/480; 525/165, 191, 308.1
See application file for complete search history.

(56) References Cited

U.S. PATENT DOCUMENTS

| | | | |
|---|---|---|---|
| 3,447,207 A | 6/1969 | Danzer | 24/16 |
| 3,548,048 A | 12/1970 | Hughes et al. | |
| 3,553,157 A | 1/1971 | Dijkstra et al. | 260/40 |
| 3,579,609 A | 5/1971 | Sevenich | 260/873 |
| 3,582,453 A | 6/1971 | Sloan et al. | 161/123 |
| 3,651,196 A | 3/1972 | Starkweather, Jr. | 264/178 |
| 3,862,265 A * | 1/1975 | Steinkamp et al. | 525/285 |
| 4,022,863 A | 5/1977 | Karass et al. | 264/210 |
| 4,130,681 A | 12/1978 | DeWoskin | 428/102 |
| 4,248,991 A * | 2/1981 | Negi et al. | 526/331 |
| 4,260,690 A | 4/1981 | Binsack et al. | 525/64 |
| 4,368,295 A | 1/1983 | Newton et al. | 525/166 |
| 4,409,167 A | 10/1983 | Kolouch et al. | 264/102 |
| 4,827,578 A * | 5/1989 | Heckerman et al. | 24/265 A |
| 4,892,768 A | 1/1990 | Cheung et al. | 428/57 |
| 4,963,430 A | 10/1990 | Kish et al. | 428/220 |
| 5,372,765 A | 12/1994 | Chen et al. | 264/101 |
| 5,525,391 A | 6/1996 | Dipede et al. | 428/57 |
| 5,660,787 A | 8/1997 | Van Erden et al. | 264/476 |
| 5,695,709 A | 12/1997 | Van Erden et al. | 264/476 |
| 5,759,653 A | 6/1998 | Collette et al. | 428/35.9 |
| 5,772,944 A | 6/1998 | DiPede et al. | 264/211.13 |
| 5,837,349 A | 11/1998 | Van Erden et al. | 428/192 |
| 6,210,769 B1 | 4/2001 | DiPede et al. | 428/58 |
| 6,270,891 B1 * | 8/2001 | Maugans et al. | 428/364 |
| 6,331,343 B1 * | 12/2001 | Perez et al. | 428/141 |

FOREIGN PATENT DOCUMENTS

| | | |
|---|---|---|
| CA | 1052511 | 4/1979 |
| EP | 0 377 513 A2 | 7/1990 |
| JP | 10-72547 | 3/1998 |
| JP | 2000-198887 | 7/2000 |

OTHER PUBLICATIONS

Material Safety Data Sheet (MSDS), (Product Name: ADMER SF700A®), Mitsui Chemicals America, Inc., Mar. 26, 2001 (4 pages).
Material Safety Data Sheet (MSDS), (Product Name: ADMER NF458A®), Mitsui Chemicals America Inc., Mar. 26, 2001 (4 pages).
Material Safety Data Sheet (MSDS), (Product Name: ADMER SF710A®), Mitsui Chemicals America Inc, Mar. 26, 2001 (4 pages).
Mitsui Chemicals, Inc., (Product Information Sheet: Tafmer®, Engineering Plastics Modiier) (2 pages).
Material Safety Data Sheet (MSDS), (Product Name: Admer QF500A®), Mitsui Chemicals America, Inc., Mar. 26, 2001 (4 pages).
Material Safety Data Sheet (MSDS #2896), (Material Identity: Kraton™ FG-1901 Thermoplastic Rubber), Shell Elastomers LLC (4 pages).
Material Safety Data Sheet (MDSD #2031), (Material Identity: Kraton# G-1652 Thermoplastic Rubber), Shell Elastomers LLC (3 pages).
DuPont®, DuPont Packaging, (Product Information: Appeel®—"lidding sealant resins" and Bynel®—"adhesive resins"), http://www.dupont.com/packaging/products/resins/index.html (4 pages).

(Continued)

Primary Examiner—David R Sample
Assistant Examiner—Lawrence D Ferguson
(74) Attorney, Agent, or Firm—Pauley Petersen & Erickson

(57) ABSTRACT

Polyester strapping made from polyester and less than 3% by weight of a polyolefin additive exhibits improved resistance to longitudinal splitting when the strapping is later placed under tension in packaging reinforcement applications. The polyolefin improves the longitudinal split resistance of the strapping without facilitating unwanted longitudinal stretch of the polyester strapping when under tension. The polyolefin additive may be combined with other conventional additives, or may be used alone in order to minimize costs.

20 Claims, 2 Drawing Sheets

OTHER PUBLICATIONS

DuPont®, (Product Information: Fusabond® E Series, polymer modifier), Series E Resins including MB-100D and MB-226D Chemically Modified Polyethylene (8 pages).

Exxon Mobil Chemical Company®, (Product Information Sheet: Linear Low Density Polyethylene, LL1001.32 Case Film Resin) (1 page).

The Dow Chemical Company®, Dow Plastics™, (Product Information Sheet: Resin for Blown Film Application, Ruflin HS-7046 NT7, Linear Low Density Polyethylene Resin) (2 pages).

The Dow Chemical Company®, Dow Plastics™, (Product Information Sheet: Resin for Blown Film Application, Tuflin HSE-1003 NT 7, Linear Low Density Polyethylene Resin) (2 pages).

Equistar Chemicals, LP, (Product Information Sheet: Petrothene® PP31S4A, Polypropylene Homopolymer Injection Molding Grade) (1 page).

Equistar Chemicals, LP, (Product Information Sheet: Petrothene® PP31S1A, Polypropylene Homopolymer Fiber and Sheet Extrusion Grade) (1 page).

Equistar Chemicals, LP, (Product Information Sheet: Petrothene® PX 165, Extrudable Tie-Layer Resin— Anhydride Modified LDPE) (1 page).

Equistar Chemicals, LP, (Product Information Sheet: Alathon® L 5845, High Density Polyethylene MMW Film Grade) (1 page).

Huntsman Corporation, (Product Information Sheet: Polypropylene—Homopolymer P4G3Z-050) (1 page).

Huntsman Corporation, (Product Information Sheet: Polypropylene—Homopolymer P4G2Z-026) (1 page).

Crompton Corporation, Uniroyal Chemical Products, Polymer Modifiers, (Product Information Sheet: Royaltuf® Modified EPDM Products, (various products)) (1 page).

Crompton Corporation, Uniroyal Chemical Products, Polymer Modifiers, (Product Information Sheet: Polybond® Modified Polyolefin Products, (various products)) (1 page).

Uniroyal Chemical Company, Inc., (Product Information Sheet: Royaltuf®, Polymer Modifiers, Royaltuf® 485, Chemically Modified Polyolefin, *Developmental Product*) (2 pages).

Uniroyal Chemical Company, Inc., Royaltuf®, Polymer Modifiers, (Product Information Sheet: Royaltuf® 498, (Formerly X974025), Chemically Modified Polyolefin) (1 page).

Uniroyal Chemical Company, Inc., Polybond®, Polymer Modifiers, (Product Information Sheet: Polybond® 3009, Chemically Modified Polyolefin) (2 pages).

Uniroyal Chemical Company, Inc., Polybond®, Polymer Modifiers, (Product Information Sheet: Polybond® 3109 (Formerly EXP 1-15-6), *Developmental Product*, Chemically Modified Polyolefin) (2 pages).

Polichem srl, Advanced Chemical Systems for Polymers, Technical Sheet, AUSIPOL PP-30, p. 1.

Polichem srl, Advanced Chemical Systems for Polymers, Technical Sheet, AUSISTRAP AF-DDP, pp. 1-2.

Polichem srl, Technical Sheet, MAGISTRAC AF-ST, pp. 1-2.

Polichem srl, Technical Sheet, REGRATEX DF, p. 1.

Polichem srl, Advanced Chemical Systems for Polymers, Material Safety Data Sheet, Oct. 2000, pp. 1-3.

Polichem srl, Technical Sheet, AUSISTRAP AF-DDP, pp. 1-2.

Polichem srl, Material Safety Data Sheet, AUSISTRAP AF-DDP, pp. 1-3, Jun. 2007.

Polichem srl, Technical Sheet, REGRATEX MB-D, p. 1.

\* cited by examiner

HIGH INTEGRITY POLYESTER STRAPPING

FIELD OF THE INVENTION

This invention relates to improved polyester strapping useful for binding pallets, bales, large boxes and the like. In particular, the invention relates to polyester strapping having improved resistance to splitting in the longitudinal direction, while under tension, and improved weldability.

BACKGROUND OF THE INVENTION

Strapping made of metal or high strength plastic has long been used to secure the packaging of heavy boxes, pallets loaded with bricks and other heavy objects, large textile bales, and other packaging applications which require high strength reinforcement. Common materials used for the strapping include metal, polyester and polypropylene. Metal strapping is quite strong, but is also relatively expensive. Polypropylene strapping is less expensive, but may stretch longitudinally and loosen when under high tension. Polyester strapping is less expensive than metal strapping, is very strong, and is not easily stretched. For this reason, polyester strapping is useful in a wide variety of reinforcing applications.

Polyester strapping is commonly produced by forming continuous strips of polyester using a spinneret or other extrusion die, and molecularly orienting the strips in the longitudinal direction under conditions of heat and tension. The molecular orientation increases the strength of the strapping in the longitudinal direction. However, as the polyester molecules become more aligned in the longitudinal (machine) direction, they become less entangled in the lateral (transverse) direction. As a result, the increased strength of the strapping in the longitudinal direction resulting from the orientation, comes at the expense of reduced strength in the lateral direction. When the polyester strapping is pulled tight in the longitudinal direction during use, the resulting necking and bending stresses in the lateral direction may render the polyester strapping more susceptible to split in the longitudinal direction along a substantial length, ranging from a few centimeters to one meter or more.

Various attempts have been made to reduce the longitudinal splitting of polyester strapping by adding elastomeric ingredients or subjecting the strap to specialized processing, for instance, as described in U.S. Pat. No. 6,210,769. To date, these attempts have not resulted in a practical, cost effective technology to reduce split.

SUMMARY OF THE INVENTION

The present invention is directed to polyester strapping which contains polyester and less than 3% by weight of a polyolefin additive selected from reactive or non-reactive linear low density polyethylene, branched low density polyethylene, high density polyethylene, polypropylene and combinations of the materials. The polyolefin can be used alone or in combination with other (e.g., conventional) additives, provided that the total additive concentration is less than 8% by weight, and the amount of polyester is more than 92% by weight of the polyester strapping. Some of the other suitable additives are listed below.

The polyester strapping of the invention has been shown to exhibit increased resistance to longitudinal splitting. Because the polyolefin additive is used in amounts of less than 3% by weight, it does not significantly affect the high strength and low stretchability of the polyester strapping in the longitudinal direction.

The present invention is also directed to a process for making polyester strapping according to the composition of the invention.

DETAILED DESCRIPTION OF THE PRESENTLY PREFERRED EMBODIMENTS

Figure 1:
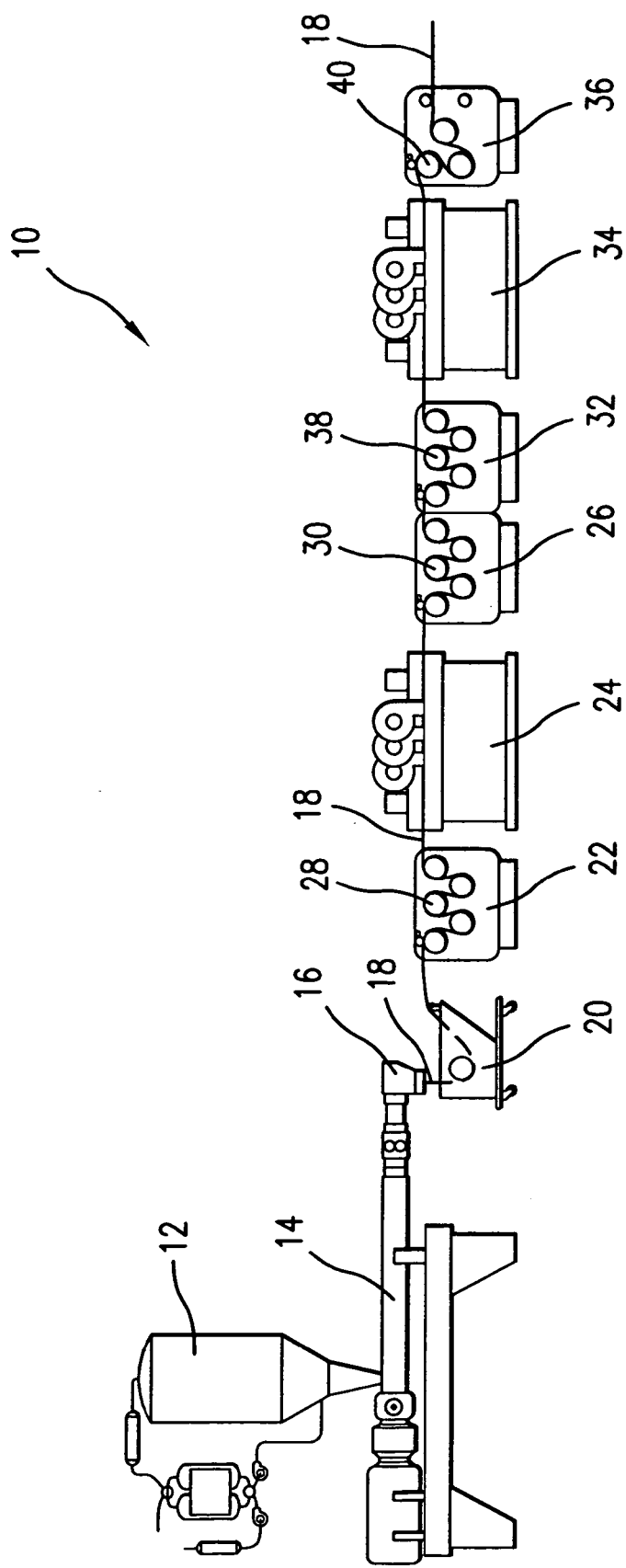
FIG. 1 is a schematic view of a process for making polyester strapping according to the invention.

The present invention is directed to polyester strapping having improved integrity, and a process for making it. The polyester strapping is composed primarily of a polyester. Desirably, the polyester is selected from polyethylene terephthalate, polybutylene terephthalate, polyethylene naphthalate, polyethylene isophthalate, and copolymers and combinations thereof. Preferably, the polyester is polyethylene terephthalate. The polyester may have an intrinsic viscosity of about 0.7-1.2 measured using the Goodyear Solution IV test method. The test is equivalent to ASTM D-2857 for Dilute Solution Viscosity of Polymers.

The polyester constitutes more than 92% by weight of the polyester strapping. The polyester desirably constitutes more than 94%, more desirably more than 97% by weight of the polyester strapping, for instance, from 97.2-99.8% by weight of the polyester strapping. For example, the polyester may constitute from 98.0-99.6% by weight of the polyester strapping, for instance from 98.5-99.5% by weight of the polyester strapping.

The polyester strapping also includes a polyolefin additive selected from linear low density polyethylene, branched low density polyethylene, high density polyethylene, polypropylene, and combinations thereof. The polyolefin may be reactive or non-reactive. Polyolefins are generally non-reactive, but can be rendered reactive by chemical modification (grafting) with a polar monomer as described below.

The term "low density polyethylene" refers to homopolymers of ethylene and copolymers of ethylene with up to 25% by weight of a $C_3$ to $C_{20}$ alpha-olefin comonomer, which have a density in the range of 0.860 to 0.935 grams/cm$^3$. Desirably, the density is between 0.900-0.930 grams/cm$^3$, preferably between 0.910-0.925 grams/cm$^3$.

The term "linear low density polyethylene" refers to low density polyethylene copolymers as described above, whose main polymer chain is essentially linear with not more than 5 long chain branches per 1000 ethylene units. Long chain branches are defined as including carbon chains having longer than 10 carbon units. Depending on the density of the linear low density polyethylene, the comonomer may constitute from 3-25% by weight of the polymer, with lower comonomer contents generally representing linear polymers at the higher end of the density range. Examples of preferred comonomers are butylene, hexene and octene. The linear low density polyethylene may have a melt index of about 0.5-12 grams/10 min, suitably about 1-3 grams/10 min, measured using ASTM D1238 at 190° C. with a load of 2.16 kg.

The term "branched low density polyethylene" refers to low density polyethylene homopolymers and copolymers as described above, having more than 5 long chain branches per 1000 ethylene units. The branched low density polyethylene may have the same melt index ranges described for linear low density polyethylene.

The term "high density polyethylene" refers to polyethylene homopolymers and ethylene-alpha olefin copolymers having densities in excess of 0.935 grams/cm$^3$, typically about 0.945-0.960 grams/cm$^3$. The high density polyethylene may have the same melt index ranges described for linear low density polyethylene.

The term "polypropylene" includes propylene homopolymers and propylene-alpha olefin copolymers containing up to 7% by weight of a $C_2$ or $C_4$-$C_{10}$ alpha-olefin comonomer. The term does not include propylene-ethylene rubbers or similar materials having higher comonomer contents. Polypropylenes typically have densities of about 0.875-0.900 grams/cm$^3$. The polypropylene may have a melt flow rate of about 1-20 grams/10 min, suitably about 2-10 grams/10 min, measured using ASTM D1238 at a temperature of 230° C. and a load of 2.16 kg.

The polyolefin additive constitutes less than 3% by weight of the polyester strapping, for instance, from 0.2-2.8% by weight of the polyester strapping. For example, the polyolefin additive may constitute from 0.4-2.0% by weight of the polyester strapping, for instance from 0.5-1.5% by weight of the polyester strapping. The preferred additive is linear low density polyethylene. Suitable linear low density polyethylenes include ESCORENE® 1001.32 and 1002.32 ethylene-alpha olefin copolymers sold by the Exxon-Mobil Chemical Co. These polymers have melt indices of 1.0 and 2.0 grams/10 min., respectively, densities of about 0.918 grams/cm$^3$, a butene comonomer, and can be added in the amounts described above.

In many applications, the polyolefin will perform quite well in reducing or eliminating longitudinal splitting of the polyester strapping. In order to minimize cost, it is desired to employ the polyolefin in an unmodified form, as the only additive to the polyester. However, it is also within the scope of the invention to maximize the longitudinal split resistance and improve the weldability of the strapping in some of the most difficult applications by a) chemically modifying some of the polyolefin additive to make it reactive with the polyester, and/or b) combining the polyolefin with one or more conventional additives.

Chemical modification of the polyethylene may be accomplished by grafting the polyolefin with about 0.1-3.0% by weight, desirably about 1.0-2.0% by weight of a polar monomer, based on the weight of the polyolefin, to produce a chemically modified (i.e., grafted) polyolefin. The chemical modification may be accomplished using conventional techniques, with the aid of heat in an extruder or other high temperature reactor, or with the aid of a catalyst in a solution reactor. Suitable polar monomers include maleic anhydride, maleic acid, acrylic acid and the like. When a chemically modified polyolefin is employed, it is desirably mixed with unmodified polyolefin in an amount of about 5-50% by weight modified polyolefin and 50-95% by weight unmodified polyolefin, preferably about 10-25% by weight modified polyolefin and 75-90% by weight unmodified polyolefin. In this embodiment, because both of the additive components are polyolefins, the total amount of chemically modified and unmodified polyolefins should be within the ranges stated above based on the weight of the polyester strapping. For instance, the total amount of polyolefin additives is less than 3% by weight of the polyester strapping, suitably 0.2-2.8% by weight, for example 0.4-2.0% by weight, for instance 0.5-1.5% by weight.

Commercially available chemically modified polyethylenes are sold by Mitsui Petrochemical Co. under the trade name ADMER®, by Mitsui Petrochemical Co. under the trade name TAFMER®, by E.I. DuPont DeNemours & Co. under the trade name CXA®, and by Uniroyal Co. under the trade name CROMPTON®.

Commercially available chemically modified polypropylenes include maleic anhydride-grafted polypropylene sold by Mitsui Petrochemical Co. under the trade name ADMER®, by Uniroyal Co. under the trade name CROMPTON®, and by E.I. DuPont DeNemours & Co. under the trade names CXA® and FUSABOND®.

Alternatively, the polyolefin additive may be combined with a conventional elastomeric material additive. Elastomeric additives include propylene-ethylene copolymer rubbers (containing 40-80% by weight propylene and 20-60% by weight ethylene), propylene-ethylene-diene elastomers, styrene-butadiene elastomers, styrene-ethylene-propylene elastomers, styrene-ethylene-butene-styrene elastomers, and the like. When the elastomeric additives are employed, the total amount of polyolefin and elastomer additives should constitute less than 8% by weight of the polyester strapping, suitably less than 6% by weight of the polyester strapping. The elastomeric material may be used in an amount needed to provide the polyester strapping with optimum longitudinal split resistance without unduly reducing the longitudinal stretching resistance of the polyester strapping. One suitable family of elastomeric additives includes styrene-(ethylene-butylene)-styrene, styrene-butudiene-styrene, styrene-(ethylene-propylene)-styrene, and styrene-isoprene-styrene block copolymers sold by Kraton Polymers LLC under the trade name KRATON®.

Styrene-based elastomeric additives, which can suitably added at about 0.5-2.0% by weight of the polyester strapping, include polystyrene alone or combined with styrene-butadiene compounds, as well as styrene-butylene copolymers, high impact polystyrene (e.g. polystyrene combined with butadiene rubber), and combinations thereof. Examples include MC6800 high impact polystyrene from Chevron Phillips Chemical Co., Polystyrene 147F from BASF, STYROLUX and STYROFLEX styrene-butadiene block copolymers from BASF.

In most instances, the total amount of polyolefin and other additives should not exceed 6% by weight of the polyester strapping, and the amount of polyolefin will be less than 3% by weight of the strapping.

The polyester strapping of the invention may have a width of about 0.5 cm to 3.0 cm, desirably about 1 cm to about 2.5 cm, preferably about 1.25 cm to about 2.0 cm. The polyester strapping may have a thickness of about 0.03 cm to about 0.20 cm, desirably about 0.05 cm to about 0.15 cm, preferably about 0.08 cm to about 0.10 cm. The surface of the strapping may be plain and smooth, or may be embossed or printed with a suitable pattern or design. Depending on the end use application, each piece of strapping may have a length ranging from about 0.5 meter to 3 meters or more.

The polyester strapping typically includes polyester molecules which have been oriented in the longitudinal direction of the strapping. Typically, the orientation is accomplished by heating a precursor strapping to a temperature which is above the softening point and below the melting point of the polyester, and stretching the precursor strapping to about 3-7 times its initial length, desirably to about 4-6 times its initial length. A suitable stretching temperature for polyethylene terephthalate is about 130-170° C., desirably about 140-160° C.

FIG. 1 schematically illustrates a process 10 for preparing polyester strapping according to the invention. Referring to FIG. 1, an extruder feed throat system 12 is used to feed polyester pellets and pellets of the polyolefin additive into an extruder 14. The details of the feed throat system will be discussed below with respect to FIG. 2.

The extruder 14 melts the polyester and low density polyethylene, and mixes them together. The temperature inside the extruder is typically set at about 260-290° C., desirably about 275° C. For optimal extrusion performance and product properties, the polyester should have an intrinsic viscosity at 285° C. of about 0.70-1.20 deciliters per gram, desirably 0.73-1.10 deciliters per gram, measured using conventional techniques indicated above. The polyolefin additive should have a melt index or melt flow rate within the ranges indicated above. Other additives, if used, may have a wide variety of melt index and melt flow rates, measured by conventional methods. The extruder 14 may be a single screw or twin screw extruder, configured for the melting, mixing and conveying of polyester.

The extruder 14 conveys the polyester composition to a die 16, where the composition is extruded in the form of a strand 18, or a plurality of strands, into a water bath 20. In alternative embodiments, the die 16 may be replaced with a plurality of dies, arranged in parallel, with each die 16 extruding one or more strands 18 into the water bath 20. The strand or strands 18 are typically rectangular in shape, corresponding to the shape of rectangular slot openings present in the face of the die. The water bath 20 is used to rapidly quench the strand, in order to minimize the crystallization of the polyester.

After being quenched, each strand 18 enters and passes through a first roller assembly 22, an oven 24, and a second roller assembly 26, which are collectively used for longitudinally orienting the strand 18. The first roller assembly 22 includes a plurality of nip rollers 28, at least some of which are heated. The nip rollers 28 turn at a first surface velocity, with each roller turning in a direction which conveys the strand 18 forward. The strand 18 winds around and between the nip rollers 28, and is preheated before passing through the oven 24, and to the second roller assembly 26. The second roller assembly 26 includes a plurality of nip rollers 30, at least some of which are heated. The nip rollers 30 turn at a second surface velocity which is faster than the first surface velocity of the nip rollers 28, causing longitudinal orientation of each strand 18 through the oven 24 and between the second set of nip rollers 30.

The first nip rollers 28, oven 24 and second nip rollers 30 are set to temperatures which facilitate heating and longitudinal orientation of each strand 18. Each strand 18 is typically longitudinally oriented by stretching to a length which is about 3-7 times its initial, unstretched length, desirably about 4-6 times its initial, unstretched length. Typically, about 80% of the stretching will take place in the oven 24, and about 20% of the stretching will take place in the second nip roller assembly 26. For instance, where it is desired to stretch a strand 18 to five times its initial length, the second nip rollers 30 will be set to turn at a second surface velocity which is five times as fast as the first surface velocity of the first nip rollers 28. The strand 18 will be stretched to about four times its initial, unstretched length in the oven 24, and slightly further, to about five times its initial, unstretched length, after leaving the oven 24.

After leaving the second nip roller assembly 26, each strand 18 is subjected to an annealing process which includes a third nip roller assembly 32, a second oven 34, and a fourth nip roller assembly 36. The third nip roller assembly 32 includes a third set of nip rollers 38, at least some of which are heated, which turn at a third surface velocity which is desirably about the same as the second surface velocity of the second nip rollers 30. The fourth nip roller assembly 36 includes a fourth set of nip rollers 40, which may or may not be heated, and which turn at a fourth surface velocity that is slightly less than the third surface velocity of the third set of nip rollers 38. The fourth surface velocity may be about 90% to less than 100% of the third surface velocity, and can be about 95% of the third surface velocity.

The third nip rollers 38, oven 34 and fourth nip rollers 40 are set to temperatures which facilitate slight longitudinal direction annealing (shrinkage) of each strand 18, for example to about 95% of its previously stretched length. The resulting polyester strapping, formed from the polyester and polyolefin additive, is cooled and wound for storage and subsequent use. The polyester strapping has improved longitudinal split resistance due to the presence of the polyolefin additive.

Other processes may also be used to make the polyester strapping including, for instance, a sheet extrusion process. In a sheet extrusion process, the polyester and additive composition is formed into a sheet. The extruded sheet is molecularly oriented in the longitudinal (machine) direction and sometimes in the lateral (transverse) direction. The oriented sheet is then cut into strapping having the desired width.

Figure 2:
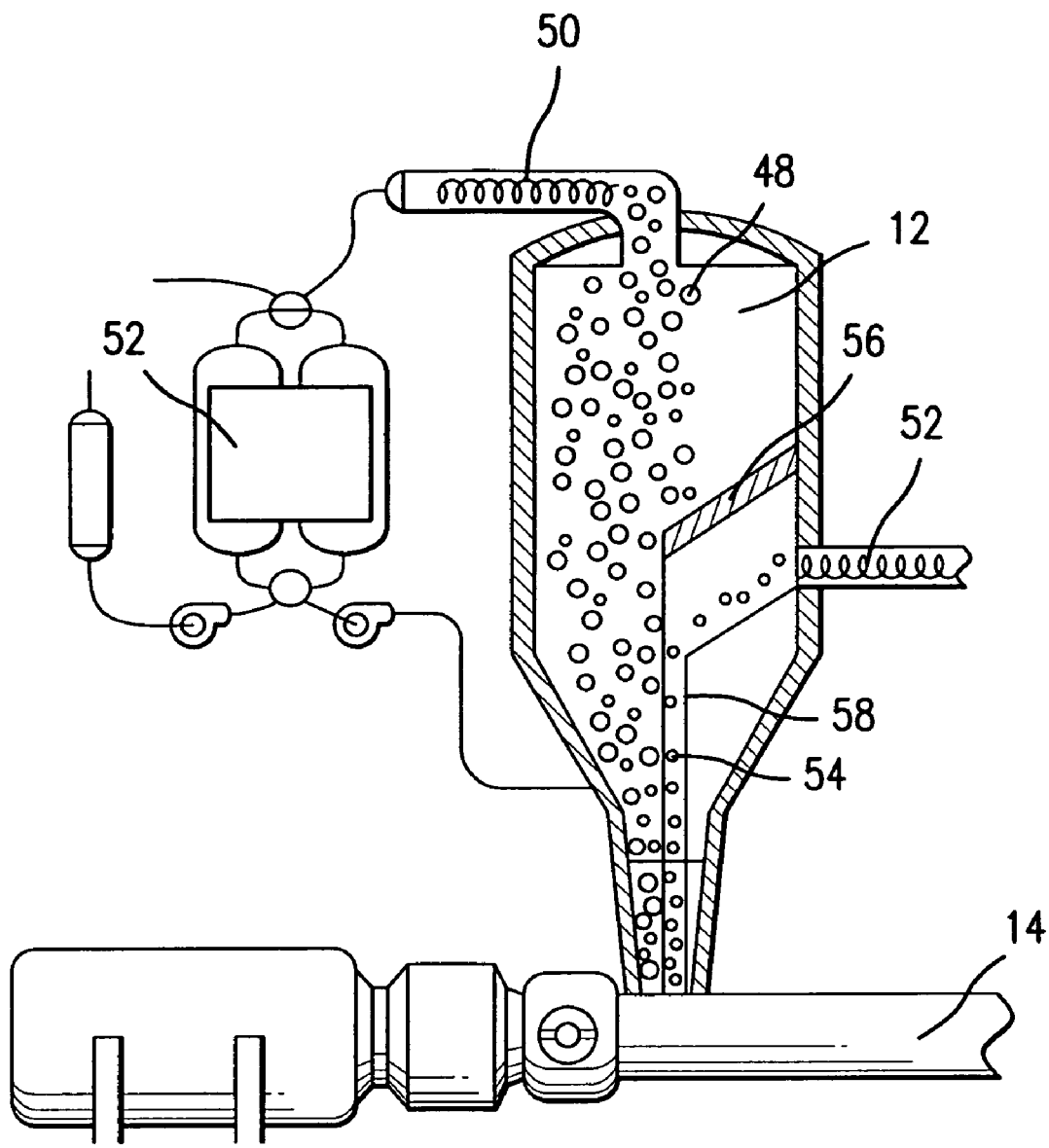
FIG. 2 is a schematic view of an extruder feed throat arrangement useful in the process of the invention.

FIG. 2 illustrates one embodiment of an extruder feed throat arrangement 12 designed for extruder 14. The polyester pellets 48 are heated to about 175-180° C. and dried, and are fed to the feed throat using a metering device 50 at a predetermined rate. The polyolefin pellets 54 are fed from one side of the feed throat using a separate metering device 52. A bed 60 of polymer pellets is maintained at the bottom of the hopper 12, when extruder 14 is full.

It is desirable to prevent the polyolefin pellets from melting and sticking to the side of the feed throat 12, which would prevent them from reaching the extruder 14. To accomplish this, a deflector plate 56 is positioned above the region where the polyolefin pellets enter the feed throat 12. The deflector plate 56 prevents the hot polyester pellets from directly contacting the polyolefin as it is being fed. Furthermore, the polyolefin pellets are fed into a jacketed channel 58 which can be continuously cooled using water or another cooling fluid. The jacketed channel 58 extends all the way to the extruder 14. The jacketed channel 58 prevents the polyolefin pellets from being heated to a softening or sticking temperature, and prevents the polyester pellets from contacting the polyolefin pellets, until after both polymers have entered the extruder 14. Alternatively, the polyolefin pellets may be added directly to the polyester stream at the feed throat, or melted and added directly to the extruder.

While the embodiments of the invention described herein are presently preferred, various modifications and improvements can be made without departing from the spirit and scope of the invention. The scope of the invention is defined by the appended claims, and all changes that fall within the meaning and range of equivalents are intended to be embraced therein.

I claim:
1. Strapping which has been molecularly oriented by stretching in a longitudinal direction of the strapping, having a width of 0.5-3 cm and a thickness of 0.03-0.20 cm, comprising:
   about 97.2-99.8% by weight polyester; and
   about 0.2-2.8% by weight of one or more polyolefins selected from the group consisting of linear low density polyethylene, branched low density polyethylene, a high density polyethylene, polypropylene, and combinations thereof;

wherein the polyolefin is chemically unmodified and causes the strapping to have increased resistance to splitting in the longitudinal direction.

2. The strapping of claim 1, comprising:
98.0-99.6% by weight of the polyester; and
0.4-2.0% by weight of the one or more polyolefins.

3. The strapping of claim 1, comprising:
98.5-99.5% by weight of the polyester; and
0.5-1.5% by weight of one or more polyolefins.

4. The strapping of claim 1, wherein the polyester is selected from the group consisting of polyethylene terephthalate, polybutylene terephthalate, and combinations thereof.

5. The strapping of claim 1, wherein the polyester is selected from the group consisting of polyethylene napthalate, polyethylene isophthalate, and combinations thereof.

6. The strapping of claim 1, wherein the polyester has an intrinsic viscosity in the range from 0.7-1.2 deciliters per gram.

7. The strapping of claim 1, wherein the polyolefin comprises linear low density polyethylene.

8. The strapping of claim 1, wherein the polyolefin comprises polypropylene.

9. The strapping of claim 1, further comprising a polyolefin that is chemically grafted with a polar monomer.

10. The strapping of claim 1, further comprising an elastomeric material.

11. The strapping of claim 9, wherein the elastomeric material comprises a styrene block copolymer.

12. The strapping of claim 1, consisting essentially of the polyester and the one or more polyolefins.

13. The strapping of claim 1, wherein the width is in the range from 1-2.5 cm and the thickness is in the range from 0.05-0.15 cm.

14. The strapping of claim 1, having a uniaxially oriented length which is in the range from 3-7 times an initial, unstretched length.

15. Strapping which has been molecularly oriented by stretching in a longitudinal direction of the strapping, having a width of 0.5-3 cm, a thickness of 0.03-0.20 cm and an oriented length which is 3-7 times an initial, unstretched length, comprising:
about 97.2-99.8% by weight polyester; and
about 0.2-2.8% by weight of one or more polyolefins selected from the group consisting of linear low density polyethylene, branched low density polyethylene, high density polyethylene, polypropylene, and combinations thereof;
wherein the polyolefin is non-reactive and causes the strapping to have increased resistance to splitting in the longitudinal direction.

16. The strapping of claim 15, wherein the non-reactive polyolefin comprises polypropylene having a density of about 0.875-0.900 grams/cm$^3$ and a melt flow rate of about 1-20 grams/10 mm.

17. The strapping of claim 15, wherein the non-reactive polyolefin comprises linear low density polyethylene having a melt index of about 0.5-12 grams/10 min. and a comonomer selected from the group consisting of butane, hexene, and octene.

18. The strapping of claim 15, comprising:
98.0-99.6% by weight of the polyester; and
0.4-2.0% by weight of the one or more polyolefins.

19. Strapping which has been molecularly oriented by stretching in a longitudinal direction of the strapping, having a width of 0.5-3 cm, a thickness of 0.03-0.20 cm and an oriented length which is 3-7 times an initial, unstretched length comprising:
about 97.2-99.8% by weight polyester selected from the group consisting of polyethylene terephthalate, polybutylene terephthalate, polyethylene naphthalate, polyethylene isophthalate, and combinations thereof; and
about 0.2-2.8% by weight of one or more polyolefins selected from the group consisting of linear low density polyethylene, polypropylene, and combinations thereof;
wherein the polyolefin is non-reactive and causes the strapping to have increased resistance to splitting in the longitudinal direction.

20. The strapping of claim 19, wherein the polyester has an intrinsic viscosity of about 0.7-1.2 deciliters per gram.

\* \* \* \* \*

UNITED STATES PATENT AND TRADEMARK OFFICE
CERTIFICATE OF CORRECTION

| | | |
|---|---|---|
| PATENT NO. | : 7,625,628 B2 | Page 1 of 1 |
| APPLICATION NO. | : 10/510550 | |
| DATED | : December 1, 2009 | |
| INVENTOR(S) | : Rigney et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Second Day of November, 2010

David J. Kappos
*Director of the United States Patent and Trademark Office*